United States Patent [19]

Yamaguchi et al.

[11] 4,313,341

[45] Feb. 2, 1982

[54] TORQUE DETECTING SYSTEM FOR INTERNAL COMBUSTION ENGINE

[75] Inventors: Hiroaki Yamaguchi, Anjo; Tadashi Hattori; Yoshinori Ootsuka, both of Okazaki, all of Japan

[73] Assignee: Nippon Soken, Inc., Nishio, Japan

[21] Appl. No.: 100,325

[22] Filed: Dec. 5, 1979

[30] Foreign Application Priority Data

Dec. 7, 1978 [JP] Japan .................................. 53-152335
Sep. 28, 1979 [JP] Japan .................................. 54-126217

[51] Int. Cl.³ .............................................. G01L 3/02
[52] U.S. Cl. ................................. 73/862.33; 73/117.3; 73/862.65
[58] Field of Search ............. 73/136 R, 136 B, 136 C, 73/136 A, 116, 117.3, 777, 133 R, DIG. 4

[56] References Cited

U.S. PATENT DOCUMENTS

| | | | |
|---|---|---|---|
| 3,151,258 | 9/1964 | Sonderegger et al. | 73/DIG. 4 |
| 3,164,986 | 1/1965 | Krueger | 73/136 R |
| 3,417,611 | 12/1968 | Dean et al. | 73/136 R |
| 3,686,941 | 8/1972 | Kramasz | 73/136 R |
| 3,858,440 | 1/1975 | Budraitis | 73/DIG. 4 |
| 3,903,738 | 9/1975 | Malchow | 73/136 R |

Primary Examiner—Donald O. Woodiel
Attorney, Agent, or Firm—Cushman, Darby & Cushman

[57] ABSTRACT

A torque detecting system for the internal combustion engines is disclosed. Pressure detecting device is arranged between the engine body and the engine support for detecting the pressure generated between the engine body and the engine support. An electrical circuit generates a torque detection signal in response to a detection signal produced from the pressure detecting device.

3 Claims, 19 Drawing Figures

TORQUE DETECTING SYSTEM FOR INTERNAL COMBUSTION ENGINE

BACKGROUND OF THE INVENTION

This invention relates to a simple torquechange detecting system used for a feedback control device for controlling the ignition timing or air-fuel ratio in order to achieve the optimum engine operating conditions by detecting the change in the torque generated in the internal combustion engine.

The ignition timing or air-fuel ratio of the internal combustion engine must be determined in accordance with the engine conditions in order to attain the optimum engine operating conditions.

In conventional systems, the engine speed is detected by the centrifugal advancing mechanism and the negative intake pressure by the vacuum advancing mechanism, so that such factors representative of the engine conditions are generally used to determine the ignition timing. From the viewpoint of engine efficiency and fuel cost, it is considered best to effect ignition at the minimum advance for best torque (MBT), and the ignition timing must be changed to conform with MBT in accordance with the engine conditions.

In the above-mentioned conventional systems, however, the ignition timing is programmed at an average on the basis of the results of the tests on the internal combustion engines, and therefore the ignition timing is considerably displaced from the actual MBT. The programmed ignition point differs from the actual ignition point due to the atmospheric condition or variations in individual engine characteristics. It is difficult to correct such differences in actual practice, with the result that ignition often fails at the required advance angle. For correction of the difference in ignition point, the corrective factors include the number of revolutions par unit time, negative intake pressure, temperature and other various environmental conditions. Further, MBT is undergoing a constant change. Considering all these corrective factors results in a high system cost on the one hand and complicates the system on the other hand, thereby leading to the disadvantage of lack of a practical value. Furthermore, there is yet no effective means for correcting the change in engine characteristics with time.

Also, it is generally known that if the amount of fuel is fixed, the torque increases for an improved saving of fuel cost, the leaner the air-fuel ratio is made by addition of air.

Thus it is desirable to maintain the air-fuel ratio on the lean side as far as possible in order to improve the saving of fuel costs. If the air-fuel ratio exceeds the combustion limit on the lean side, however, a misfire occurs thus reducing the torque.

The combustion limit changes for different engines, or with valve timing or time, and therefore the actual air-fuel ratio is unavoidably programmed on the rich side considerably far from the combustion limit determined experimentally.

In order to obviate such problems, a feedback control may be employed to attain the ignition timing as near as MBT and the air-fuel ratio as near as the combustion limit on the lean side by detecting the change in torque generated by the engine. In spite of this, there has not yet been developed any effective means for feedback control which is compact and low in cost, for detecting the change in the torque making up a factor of feedback.

A conventional detecting device of this type is mounted on the output shaft of the engine and operates in such a manner that the engine torque is detected as a torsion of the torque transmitting shaft which is generated in transmitting the torque to a load such as the wheel shaft. Other conventional devices for detecting the torsion electrically include a strain gauge system in which the electrical resistance changes with strain, the magneto-striction type in which the magnetic characteristics of the magneto-striction tube change, and the phase difference type in which the out-of-phase condition between two points of the shaft is detected. The main object of these device is to detect the torque as an engine performance test. They are configured for measurement of the engine output, are great in weight, complicated in construction, and high in cost. For this reason, it is practically difficult to mount them on a vehicle for feedback control. Even if they can be mounted technically on the vehicle, their applications are limited due to their high cost. Their problems will be described below specifically.

(1) In all the systems mentioned above, a detector is arranged midway on the engine crank shaft and the load drive transmission shaft (propeller shaft). They are thus different from an ordinary torque transmission mechanism and therefore must be reconstructed.

(2) The output shaft of the engine must transmit high r.p.m. and high torque. Therefore, the detector arranged midway must have a strength sufficiently high to stand the revolution load. Thus it becomes large in weight, high in cost on the one hand and a signal must be taken out of the rotational member on the other hand. Also, it must be provided with signal transmission systems such as signal AC coupling, resulting in structural complication and high cost.

(3) The principle of the detector is based on the detection of the torsion of the shaft. If the detector shaft is short, strain is so small that the detection accuracy is deteriorated, and therefore the length of the detector shaft must be lengthened (generally, 30 to 40 cm) to assure an improved accuracy.

The torque detecting device of this type, therefore, is only practicable for the purpose of a test in which the increase in engine length or weight or engine reconstruction is permitted. On the other hand, it is practically difficult to carry it on a vehicle as a detector means for feedback control for its high cost, weight and size.

SUMMARY OF THE INVENTION

Accordingly, in order to obviate the abovementioned disadvantages, it is an object of the present invention to provide a low-cost simple engine torque detecting system in which upon generation of a torque by the engine, the reaction acting on the engine body is detected by a piezo-electric element arranged on the mount in accordance with the output of the engine, and the change in the electric charges generated is detected, thus detecting the magnitude of the torque.

According to the present invention, there is provided a torque detecting system for detecting the torque generated by an engine from the amount of a force on the mount of the engine body, the torque detecting system comprising a piezo-electric element arranged on the mount, means for storing the amount of an electrical signal corresponding to the torque generated, means for controlling the amount of the signal stored, and means for determining the change in stored signal. It is sufficient to determine the change in signal generated in accordance with the torque. Although a practically effective torque detector for control purposes has not yet developed, this invention provides a superior torque detecting system which operates successfully at low-cost by simple techniques.

BRIEF DESCRIPTION OF THE DRAWINGS

FIGS. 3 to 5 show other three examples of the detector according to the present invention, in which

DESCRIPTION OF THE PREFERRED EMBODIMENTS

Figure 1:
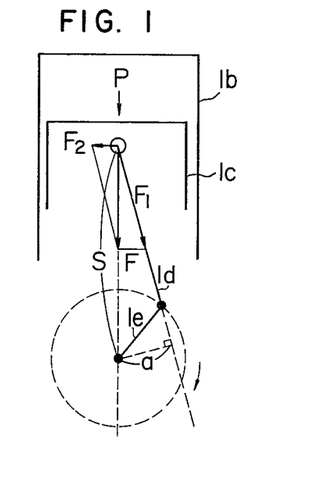
FIG. 1 is a diagram for explaining the operating principle of a torque detector according to the present invention.

The present invention will be described below with reference to the accompanying drawings. FIG. 1 shows the operating principle of the present invention. In this drawing, reference numeral $1b$ shows a cylinder of the internal combustion engine, numeral $1c$ a piston, numeral $1d$ a connecting rod, and numeral $1e$ a crank arm. With the rotation of the crank arm $1e$ in the direction of the arrow, the engine torque F1xa generated by the explosion pressure P is equal to the reactive torque F2xs (s: the length between the piston pin and the center of crank pin) generated by the horizontal component F2 of the force F forcing down the piston in explosion stroke. This reactive torque tilts the engine block and generates a force corresponding to the engine torque with the engine support. According to this invention, this force is detected to measure the torque. In the drawing shown, with the increase in torque, the reactive torque equal in magnitude to the engine torque tilts the engine toward the right as viewed from the engine front. Therefore, the force in positive relationship with the engine torque is generated at the left support. This force is used to detect the torque, and therefore according to the present invention, all that is required is to mount a force detector, thus eliminating the need for reconstruction of the drive system unlike in the conventional system. According to the present invention, there is no need to take out a signal from a rotary member by an AC coupling or the like. Instead, by a simple method in which the force detector is mounted on the support, the torque is detected at low cost.

Figure 2A:
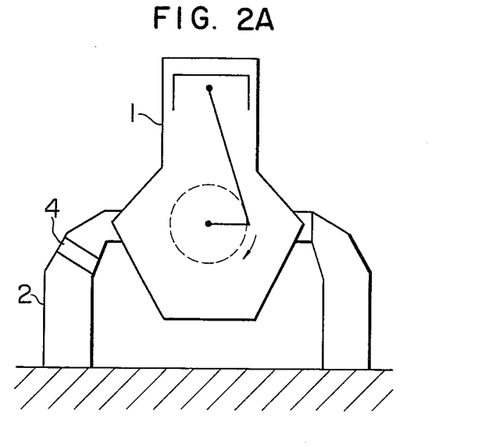
FIGS. 2A and 2B are a diagram and a sectional view of the essential parts of an embodiment showing the mounted condition of the detector according to the present invention.
Figure 2B:
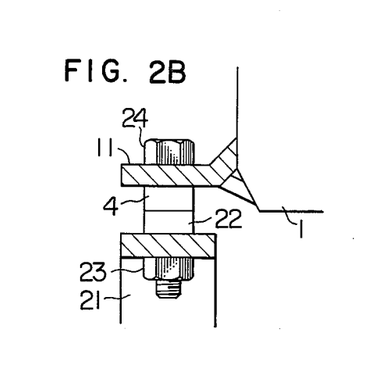

An embodiment of the present invention used for the feedback control of the ignition timing will be explained below. In FIGS. 2A and 2B, reference numeral 1 shows an engine body of a straight type engine of 4-cylinder 4-cycle. Numeral 2 shows a support for securing the engine, numeral 4 is a force detecting element comprising a piezo-electric element mounted between the engine body 1 and the support 2. This detecting element 4, as shown in FIG. 2B, is fixed together with the rubber mount 22 between the fixing part 11 of the engine body 1 and the fixing part 21 of the support 2 by bolt 24 and nut 23. (A washer may be used for fixing.)

Figure 3:
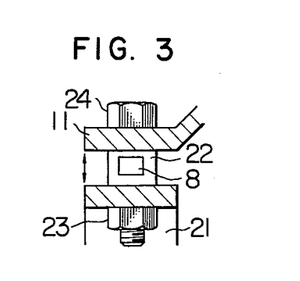
FIG. 3 is a sectional view of the essential parts of a first example.
Figure 4A:
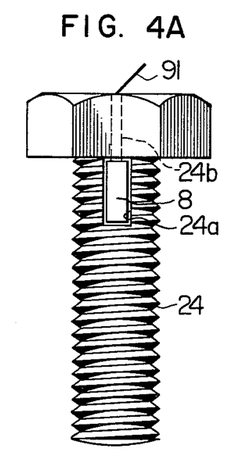
FIGS. 4(A), 4(B) and 4(C) are front and partially sectional view of a bolt and a longitudinal sectional view showing the mounted condition of the bolt respectively according to a second example of the present invention, and FIG. 5 a front view of a third example thereof.
Figure 4B:
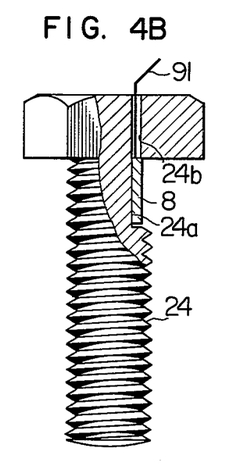
Figure 4C:
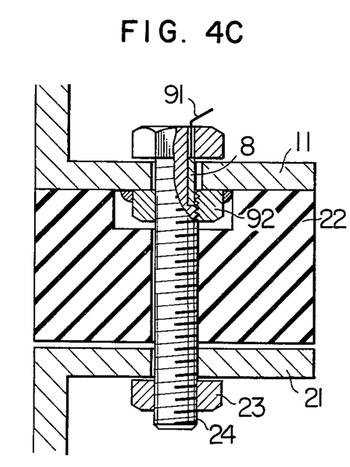
Figure 5:
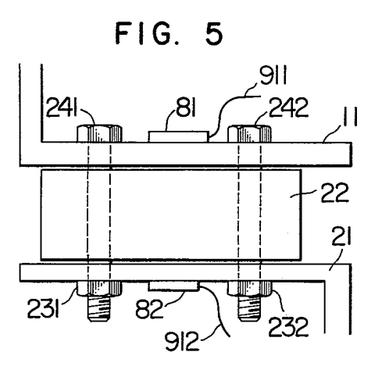

The force detecting element 4 is not limited to the piezo-electric element but may comprise such a device as a force detector. Next, a strain gauge type whose resistance changes with strain will be explained. FIGS. 3 to 5 show three examples of their mounted conditions, and in these drawings, like component elements as in FIG. 2B are denoted by like reference numerals. In FIG. 3, numeral 8 shows a strain gauge mounted on the surface of the rubber mount 22. The resistance of the strain gauge 8 changes with the expansion or contraction of the mount 22 caused by the reactive torque of the engine body 1.

In FIGS. 4A and 4B, a recess 24a is formed in the root of the bolt 24, in which recess 24a the strain gauge 8 is mounted. The lead 91 of the strain gauge 8 is taken out of the through hole 24b formed at the head of the bolt 24. The mounted condition of the bolt 24 is shown in FIG. 4C, in which like component elements as in FIG. 2B are denoted by like reference numerals. In FIG. 4C, numeral 92 shows a nut fixed by being welded to the fixing part 11 of the engine body 1. By screwing the bolt 24 to the nut 92, the bolt 24 is completely secured to the fixing part 11 of the engine body 1. In this way, the stress due to the reactive torque of the engine body 1 acts on the bolt 24 in the form of expansion or contraction in axial direction. The expansion and contraction of the bolt 24 is detected by the strain gauge 8.

Figure 6:
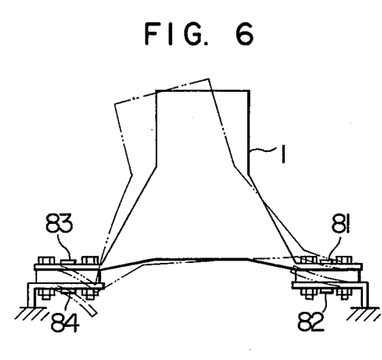
FIG. 6 is a diagram showing a general mounting condition of the detector shown in FIG. 5.
Figure 7:
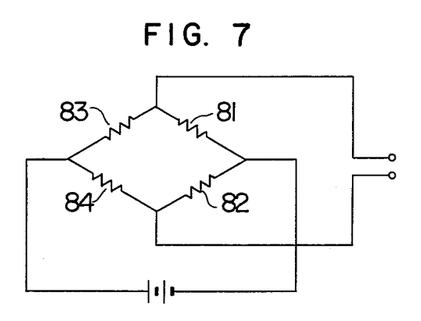
FIG. 7 is a diagram showing an electrical circuit of the detector mounted as shown in FIG. 6.

In FIG. 5, the engine fixing part 11 and the support fixing part 21 are secured to each other with two bolts 241, 242 and nuts 231, 232 on the right and left sides, so that the supporting points subjected to the force from the engine fixing part 11 and the support fixing part 21 are displaced. A strain gauge 81 is arranged between the bolts 241 and 242 on the engine fixing part 11 and a strain gauge 82 between the bolts 241 and 242 on the support fixing part 21. Numerals 911 and 912 show lead wires for the strain gauges 81 and 82 respectively. According to the construction of FIG. 5, the supporting points subjected to the forces of the engine fixing part 11 and the support fixing part 21 are displaced so that the bending stress is applied to the fixing parts 11 and 21 by the reactive torque of the engine body 1. This bending stress is detected by the two strain gauges 81 and 82. The output value is doubled if a bridge circuit is made up of these two strain gauges 81 and 82. The diagram of FIG. 6 shows the condition in which the construction shown in FIG. 5 is arranged on the supports on both sides of the engine body 1. In this drawing, numerals 81 to 84 show strain gauges respectively, which are connected to a bridge circuit as shown in FIG. 7. A two-dot chain in FIG. 6 shows the condition in which the reactive torque is generated. In FIGS. 6 and 7, assume that only the strain due to the vertical vibrations of the engine body 1 having no relation with the reactive torque is applied to the strain gauges 83 and 84. The resistance value affected by the vertical vibrations of the gauges 83 and 84 increases or decreases by the same amount, so that the output of the bridge circuit shown in FIG. 7 exhibits no effect of the vertical vibrations. Also when the lateral vibrations are applied to the engine body 1, the resistance of the strain gauges 81 and 82 changes by the same amount as that of the strain gauges 83 and 84, with the result that the effect of the lateral vibrations fails to appear in the output of the bridge circuit of FIG. 7. In the case where the stress due to the reactive torque is applied as shown by two-dot chain in FIG. 6, on the other hand, the resistance values of all the strain gauges 81, 84 and 82, 83 arranged on the opposed sides of the bridge circuit of FIG. 7 increase or decrease, so that the output of the bridge circuit of FIG. 7 shows a sufficiently large change corresponding to the magnitude of the reactive torque.

It is of course possible to detect the torque satisfactorily when the engine body 1 is mounted on the vehicle body in the embodiments of FIGS. 3 to 7.

The feature of the present invention lies in that the torque generated by the engine is detected as a pressure of the support. Thus the pressure detecting element may comprise a magneto-strictive element, a differential transformer or the like with equal effect.

Figure 8:
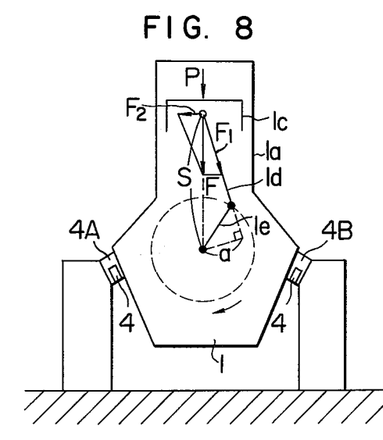
FIG. 8 is a diagram showing a configuration of a second embodiment of the detector according to the present invention in mounted condition.

Next, description will be made about a second embodiment in which a plurality of piezo-electric elements are used to absorb the vertical vibrations of the engine which are generated when it is mounted on the vehicle, thus improving the detecting accuracy as shown in FIG. 8.

As explained with reference to FIG. 1, the whole engine block tilts by the reactive torque F2xs, so that the force corresponding to the torque acts on the right and left engine mounts 4A and 4B. As a result, an output proportional to the change in force is produced from the piezo-electric elements 4 incorporated in the mounts 4A and 4B. By integrating the output of the piezo-electric elements 4 with an appropriate initial value, an output proportional to the force acting on the mounts 4A and 4B is obtained. The conspicuous feature of the present invention resides in that the output of the piezo-electric elements 4 is integrated intermittently and the initial value is reduced to zero each time of such integration.

Figure 9A:
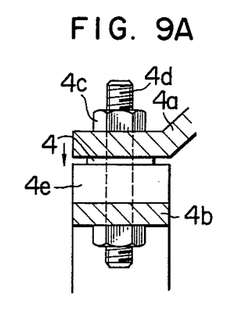
FIGS. 9A and 9B are sectional views of the essential parts of other examples of the mount of the piezo-electric element of the present invention.
Figure 9B:
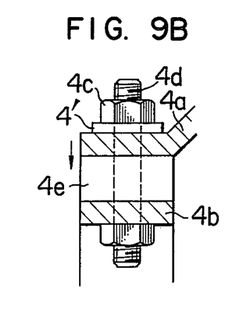

Two examples of mounting the piezo-electric elements 4 on the mounts 4A and 4B are shown in FIG. 9. The mount section comprises a fixing base 4 for the engine body 1, a mount rubber 4e and a mount bolt 4d passing through the support 4b for fixing the engine body 1, and a nut 4c. In the case of FIG. 9A, an annular piezo-electric element 4 is inserted between the fixing base 4a and the mount rubber 4, while in the case of FIG. 9B, the piezo-electric element 4' is arranged between the fixing base 4a and the nut 4c. When the construction of FIG. 9A or 9B is used for the mount 4A of FIG. 8, the increase in the torque generated in the engine and the resulting increase in the reactive torque causes the force shown in the direction of arrow to be applied to the fixing base 4a as shown in FIGS. 9A and 9B. In FIG. 9A, therefore, the compressive weight on the piezo-electric element 4 increases, while that on the piezo-electric element 4' decreases in the case of FIG. 9B. In any way, the compressive weight or the piezo-electric element 4 or 4' changes with the change in torque.

Figure 10:
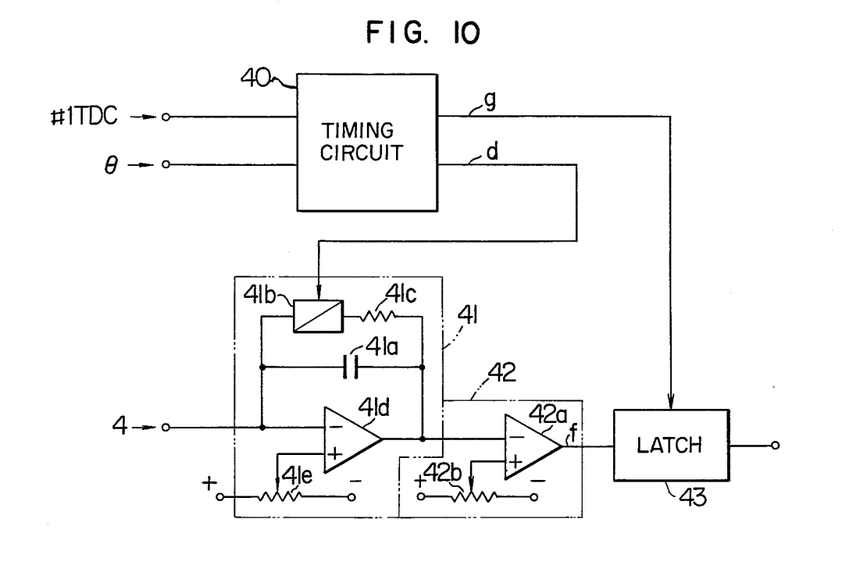
FIG. 10 is a diagram of an electrical circuit showing a second embodiment of the present invention.

Next, the configuration of the torque detecting system according to the present invention will be shown in FIG. 10. Input signals include a top dead center signal for the first cylinder (hereinafter referred to as #1TDC) for determining the charge or discharge timing, an angular signal (hereinafter referred to as $\theta$ which is generated for each one degree of crank angle) and the output of the piezo-electric elements. The output is raised to "1" with the increase in torque and reduced to "0" with the decrease therein.

The signals #1TDC and $\theta$ are used to calculate the crank angle for starting charging or discharging the feedback capacitor 41a of the integrator 41 making up a charge storage means through a timing circuit 40 making up control means, and the crank angle for sampling the output of the comparator 42.

The charge generated by the change in the compressive weight exerted on the piezo-electric element 4 is integrated by the integrator 41 at a predetermined timing, so that the comparator circuit 42 decides whether the torque has begun to increase or decrease. The latch 43 samples and stores the output of the comparator circuit 42 at a predetermined timing. The integrator 41 includes, in addition to the feedback capacitor 41a, the analog switch 41b for discharging the charges in the feedback capacitor 41a at predetermined cycles, a discharge resistor 41c, an operational amplifier 41d, and a resistor 41e for applying a reference voltage to the operational amplifier 41d. The comparator circuit 42, on the other hand, includes a comparator 42a, and a resistor 42b for applying a reference potential to the comparator 42a. The comparator circuit 42 and the latch 43 make up a charge change discriminating circuit.

Figure 11:
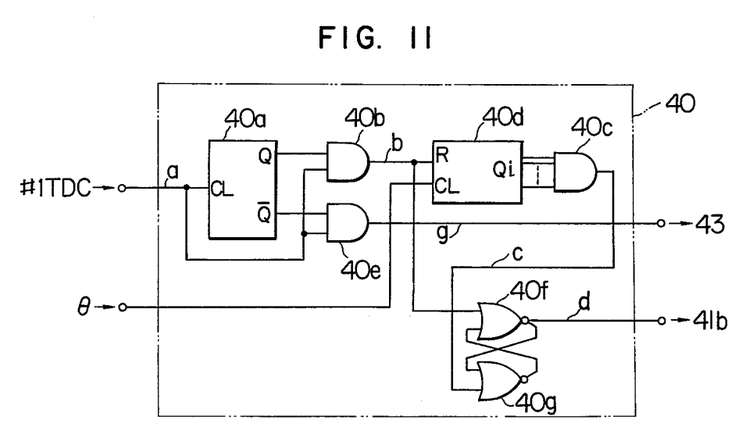
FIG. 11 is an electrical circuit diagram showing a detailed construction of a timing circuit used in the circuit of FIG. 10.
Figure 12:
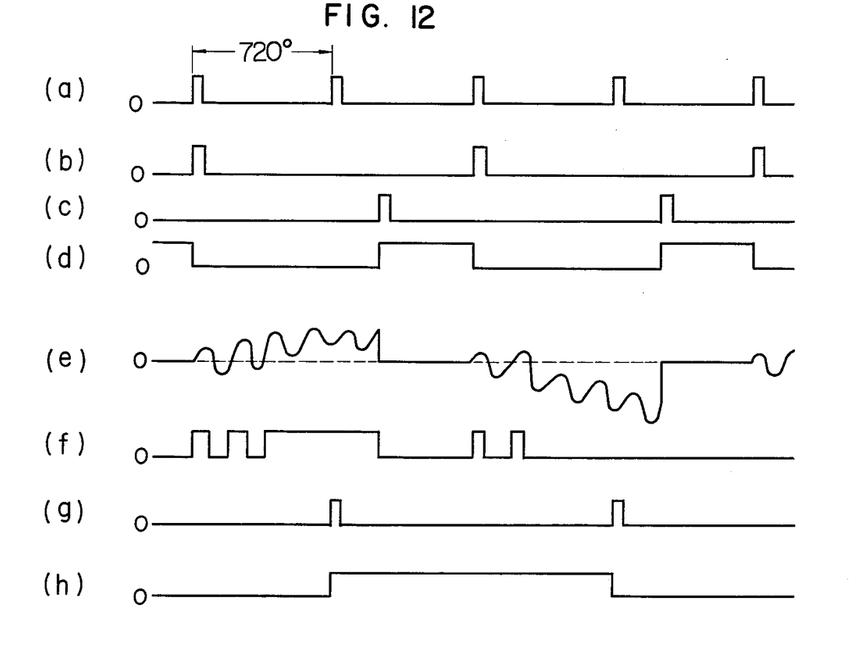
FIG. 12 shows waveforms produced at various parts for explaining the operation of the circuit of FIG. 11.

The timing circuit 40 is shown in detail in FIG. 11. Reference numeral 40a shows a flip-flop driven at the fall point of the input clock pulse which is made up of #1TDC. The outputs Q and Q of the flip-flop 40a are applied to the AND gate 40b or 40c for producing a logic sum of the output Q or Q of the flip-flop 40a and #1TDC as shown in FIG. 12a. Thus the AND gate 40a produces a charge start signal as shown in FIG. 12b, and the other AND gate 40b a sampling signal as shown in FIG. 5g. Numeral 40d shows a counter which is reset by the discharge start signal of FIG. 12b and counts the angular signal $\theta$ as input clock pulses. The binary output of the counter 40d is applied to the AND gate 40e for producing a logic sum of a predetermined order of digits of the binary output of the counter 40d. As a result, the AND gate 40e produces a discharge start signal of FIG. 12c at a predetermined crank angle after generation of the charge start signal of FIG. 12b. The discharge start signal and the charge start signal are applied to a flip-flop comprising two NOR gates 40f and 40g, thus producing a charge-discharge control signal from the NOR gate as shown in FIG. 12d.

The operation of the circuits of FIGS. 10 and 11 in the above-mentioned configuration will be explained below.

In the embodiment under consideration, the signal #1TDC shown in FIG. 12a is frequency-divided in half through the flip-flop 40a, thus producing the charge start signal, and the analog switch 41b is turned off by the charge-discharge signal of FIG. 12d, thus starting to charge the feedback capacitor 41a of the integrator 41. Since the charges in the piezo-electric element 4 discharges completely immediately before the charge start, the output of the integrator 41 is zero as shown in FIG. 12e. Therefore, the torque immediately before the charge start is the initial value, and the output of the integrator 41 corresponding thereto is zero. After charging starts, the output of the piezo-electric element 4 is integrated by the integrator 41. If the torque making up the initial value immediately before the charge start begins to increase, for instance, the output of the integrator 41 begins to increase in positive direction. If the torque begins to decrease, on the other hand, the output of the integrator 41 begins to increase in negative direction. In this embodiment, after integration for a predetermined crank angle, the latch 43 samples and stores a positive or negative output of the comparator circuit 42 of FIG. 4f in response to the sampling signal of FIG. 12g generated from the next signal #1TDC, thus deciding whether the torque has begun to increase or decrease. Such output of the latch 4d is shown in FIG. 12h. Upon completion of the sampling operation, the analog switch 4f is immediately turned off, so that all the charges in the feedback capacitor 4e discharge. As a result, the output of the integrator 41 is restored to initial state waiting for the next charge start.

Thus according to the present invention, the level to be compared is always fixed (zero), and therefore it is not necessary to hold the previous sampled value and compare the present sampled value. In this way, the configuration of the system according to the present invention is greatly simplified. Further, the system according to the present invention positively utilizes the disadvantage of the piezo-electric element 4 having essentially no static sensitivity, thus leading to a great advantage that the change in the engine torque is detected by a simple means which is low in cost.

Next, an example in which the torque detecting system according to the invention is used for controlling the ignition timing and air-fuel ratio will be explained.

Figure 13:
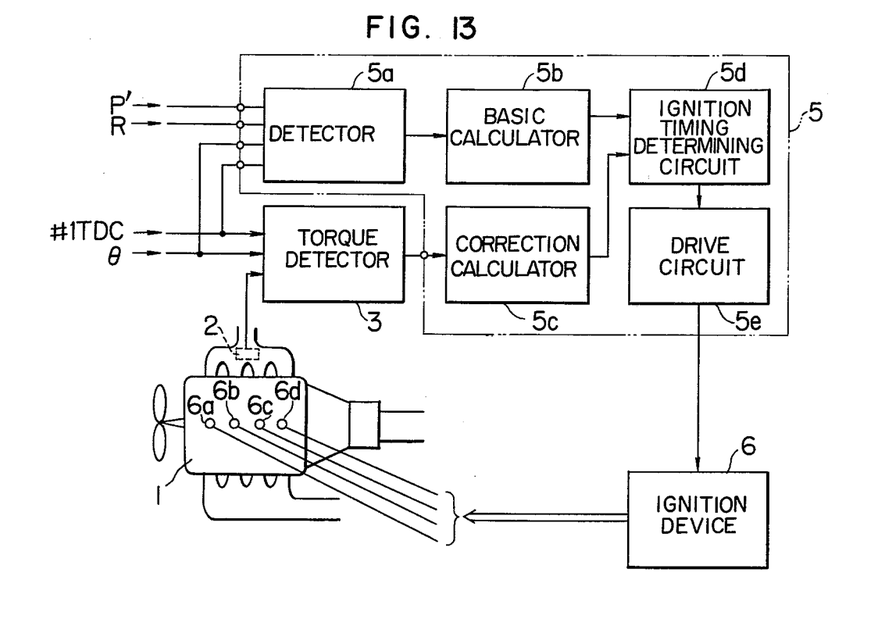
FIG. 13 is a block diagram showing the essential parts of an example of the present invention applied to an ignition timing feedback control device.

FIG. 13, reference numeral 5 shows a calculating device for calculating the ignition timing from the intake pressure P', the engine r.p.m. (detected by $\theta$ and #1TDC) and other engine conditions R and the output of the torque detecting system 3 according to the invention. Numeral 6 shows an ignition device for igniting the air-fuel mixture through the spark plugs 6a to 6d by driving the ignition coil in response to the output of the calculating device 5. The feedback system comprises steps of ignition, combustion, change in compressive weight on the mounts, detection of torque change, correction of ignition timing and ignition in that chronological order. The ignition timing calculating device 5 comprises a detector circuit 5a for detecting the engine conditions from the top dead center signal for each cylinder, the angular signal $\theta$ for each one degree of crank angle, the engine speed N, the intake pressure P' and other engine operating conditions, a basic calculator circuit 5b for calculating a predetermined basic ignition timing from the output of the detector circuit 5a, a corrective calculator circuit for detecting the amount of correction of the ignition timing in response to the output of the torque detector circuit 3, an ignition timing determining circuit 5d for finally determining the ignition timing from the outputs of the basic calculator circuit 5b and the corrective calculator circuit 5c, and a driver circuit 5e for producing a signal for driving the ignition device from the ignition timing determined as above.

The operation of the above-mentioned circuit configuration will be explained below. As mentioned above, the change in the torque generated in the engine takes the form of a change in the compressive weight of the mount. This change in compressive weight corresponds to that of the torque, so that the torque detecting device 3 as shown in FIG. 10 decides whether the torque begins to increase or decrease for every eight ignitions, i.e., for each 1440° in crank angle. If the torque begins to increase after advance of a predetermined angle, say, 1 to 3 degrees, it is decided that the ignition timing is retarded, so that a predetermined advance correction value is calculated by the corrective calculator circuit 5c and applied to the ignition timing determining circuit 5d. If the torque begins to decrease after a predetermined value, say, 1 to 3 degrees, on the other hand, it is decided that the torque is reduced by excessive advance, so that a predetermined corrective value is calculated by the corrective calculator circuit 5c and applied to the ignition timing determining circuit 5d.

The ignition timing determining circuit 5d produces a sum of the basic ignition timing determined by the basic calculator circuit 5b and the corrected advance or retarded amount determined by the corrective calculator circuit 5c, thus finally determining the ignition timing. The signal for driving the ignition coil (i.e., the signal for determining the coil energization and ignition points) by the drive circuit 5e in response to the above-mentioned signal sum is formed on the basis of the top dead center signal for each cylinder and the angular signal $\theta$ and is applied to the ignition device 6.

In this way, in the application of the torque detector according to the present invention to the ignition timing control, the torque change is directly detected and fed back to the ignition timing, thus making it possible to regulate the ignition always at MBT.

In engines mass-produced such as those of automobiles, the compact and low-cost construction of the torque detecting system is inevitable, and such a requirement is fully satisfied by the present invention.

An example in which the torque detecting system according to the present invention is used for the control of the air-fuel ratio will be explained below. In the case where the engine is operated with the fuel consumption fixed, the relation between the amount of intake air and the torque is such that the more the amount of intake air (toward lean side), the greater the torque. When the lean limit of the engine is reached, the torque gradually decreases by partial misfire, with the result that a sudden torque down occurs due to complete misfire.

With the increase in the amount of air, the fuel cost performance improves, the more the amount of intake air, and after passing the best fuel cost performance, the cost saving is reduced by misfire. This fact is generally known from various literatures. The engine, therefore, should be advantageously operated, if not misfired, on the lean side as far as possible to attain a high fuel cost saving.

According to the present embodiment, in view of this fact, the amount of the air intake by the engine is gradually increased, the change in torque is detected by the above-mentioned torque detector 3, and the amount of intake air is subjected to a feedback control, so that the engine is controlled at a point before misfire where the fuel cost performance is best in order to greatly improve the fuel cost saving.

Figure 14:
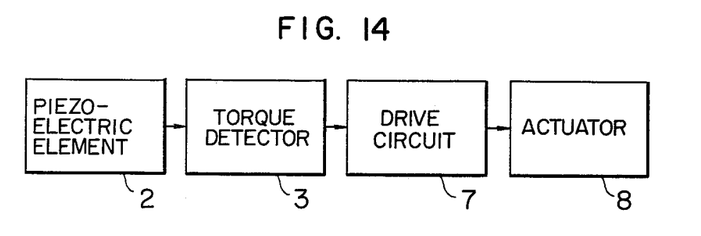
FIG. 14 is a block diagram showing the essential parts of an example in which the system according to the present invention is applied to an air-fuel ratio control device.

In FIG. 14, reference numeral 7 shows a drive circuit for applying to the actuator 8 an opening signal of the throttle valve or an on-off signal of a solenoid valve to change the amount of air to a predetermined degree in response to the output of the torque change detector 3.

The actuator 8 may be constructed in any desired way to the extent that the amount of air intake by the engine is variable. In this example of carburetor type, however, in addition to the ordinary throttle valve for controlling the amount of air intake of the engine, a bypass is provided for adding the air to the downstream of the throttle valve, and the area of such a bypass is controlled by a bypass valve (equivalent to a throttle valve) driven by a motor. As an alternative, the on-off duty cycle is changed by a solenoid valve, thus adding the air to the downstream of the throttle valve. As another alternative, fuel is adjusted by on-off control.

The system according to the present invention is operated in such a manner that if the output of the torque detector 3 is on the increase, the opening of the bypass valve is enlarged to add air. In the event that the bypass valve opening is too large and the air-fuel ratio exceeds the lean limit, by contrast, the bypass valve opening is reduced. In this way, the air-fuel ratio of the engine is always controlled at the maximum torque near the misfire limit, thus greatly improving the fuel-cost performance.

Next, explanation will be made of a method for removing the effect of the vertical vibrations of the driving system or the change in the characteristics of the piezo-electric elements with temperature or time in the case where the torque detecting system according to the present invention is mounted on a vehicle.

Figure 15:
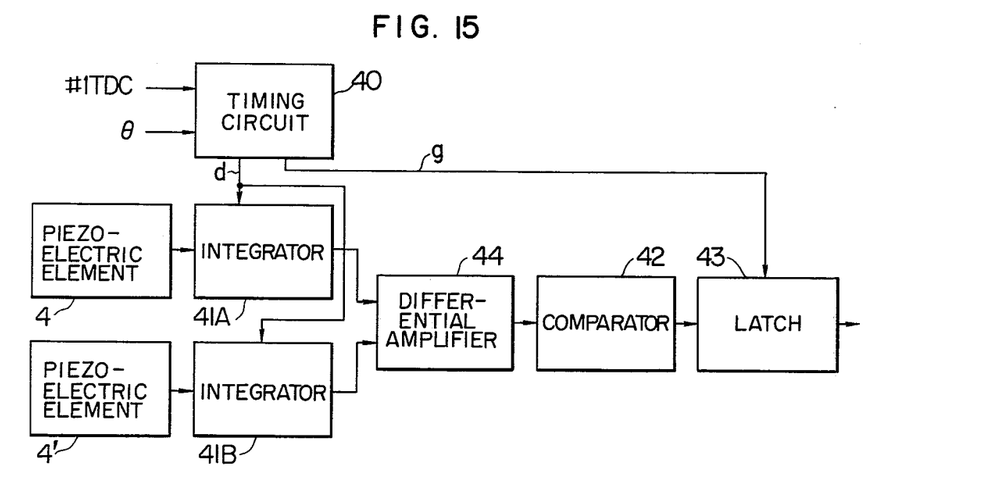
FIG. 15 is a block diagram showing a further embodiment of the system according to the present invention.

In FIG. 15, nemerals 4 and 4' show piezo-electric elements arranged on the right and left mounts 4A and 4B of the engine, which piezo-electric elements are both mounted as shown in FIG. 9A. Upon generation of a torque, the compressive weight exerted on one of the piezo-electric elements increases and that exerted on the other piezo-electric element decreases. The outputs of the piezo-electric elements thus arranged are applied to the integrators 41A and 41B respectively which charge or discharge in the same timing through the timing circuit 40. In order to absorb the vertical vibrations, the outputs of the integrators 41A and 41B are applied to the differential amplifier 44 where the difference therebetween is produced, and the output representing such a difference is compared with a predetermined value at the comparator circuit 42. Thus with the increase in the sensitivity of torque signals generated in opposite phase, the noise signals generated by the vibrations of the same phase are offset, thus greatly improving the detection accuracy.

The amplifier for the piezo-electric elements may take the form of a high-impedance amplifier the output of which is applied to an integrator to charge or discharge the capacitor of the integrator. Generally, an equal effect is attained by providing an amplifier for the piezo-electric element called a charge amplifier having a charge-discharge function. In other words, any torque detecting device may be used if the charges generated in the piezo-electric elements are charged or discharged.

In the above-mentioned embodiment, the charge or discharge is effected at cycles of 1440 degrees of crank angle. In principle, however, any other cycles which are more than one combustion stroke may be employed with equal effect. Also, the cycles may be determined on the basis of time instead of crank angle.

It is explained above that according to the present embodiment, the changes in compressive weight exerted on the right and left mounts by the reactive torque of the engine are detected by piezo-electric elements arranged on the mounts. Thus the piezo-electric elements are the only detecting means, and unlike the conventional systems, the driving system is not required to be reconstructed. Further, in view of the fact that the engine torsion is not used, it is not necessary to provide a mechanism for detecting the signal from a rotary member, resulting in a greatly simplified, compact detector. It is thus possible to realize a feedback control for torque detection which has so far been practically difficult to carry on a vehicle in view of the high cost and great weight of the conventional system in mass-produced automobiles.

Furthermore, in storing the charges generated in the piezo-electric elements, the amount of charges in reset to zero at the beginning of a cycle in order to determine the total charges stored till the completion of the cycle. Therefore, the level to be compared for comparative decision of an increase or decrease in torque is always fixed, so that the preceding sampled value is not required to be held, thus greatly simplifying the configuration of the detector circuit.

We claim:
1. A torque detecting device for internal combustion engines comprising:
   pressure detecting means including piezo-electric elements arranged between an engine body and a plurality of portions of an engine support respectively for detecting the torque by the pressure difference between said portions in order to absorb the vertical vibrations of said engine body; and
   an electrical circuit responsive to said pressure detecting means including means for storing electric charges generated in said piezo-electric elements, means for controlling the amount of charges stored in said storing means, and means for determining the change in charges stored in said storing means at predetermined cycles.

2. A torque detecting system for the internal combustion engine according to claim 1, wherein said means for storing the charges sets the charges at zero at the beginning of a cycle, and said means for determining the change in charges determines the change in torque by the change in the total amount of charges stored immediately before the completion of the cycle.

3. A torque detecting system for the internal combustion engine according to claim 1 or 2, wherein said cycle for determining the amount of stored charges is based on selected one of a predetermined time and a predetermined crank angle of the internal combustion engine.

* * * * *